US012240296B2

United States Patent
She et al.

(10) Patent No.: US 12,240,296 B2
(45) Date of Patent: Mar. 4, 2025

(54) ELECTRICAL ARCHITECTURE FOR POWERING TRANSPORTATION REFRIGERATION UNIT

(71) Applicant: Carrier Corporation, Palm Beach Gardens, FL (US)

(72) Inventors: Xu She, Cohoes, NY (US); Mary D. Saroka, Syracuse, NY (US); Jeffrey J. Burchill, Baldwinsville, NY (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 224 days.

(21) Appl. No.: 17/252,170

(22) PCT Filed: Sep. 19, 2019

(86) PCT No.: PCT/US2019/051963
§ 371 (c)(1),
(2) Date: Dec. 14, 2020

(87) PCT Pub. No.: WO2020/068556
PCT Pub. Date: Apr. 2, 2020

(65) Prior Publication Data
US 2021/0252947 A1    Aug. 19, 2021

Related U.S. Application Data

(60) Provisional application No. 62/738,689, filed on Sep. 28, 2018.

(51) Int. Cl.
*B60H 1/32* (2006.01)
*B60H 1/00* (2006.01)
(Continued)

(52) U.S. Cl.
CPC ....... *B60H 1/3232* (2013.01); *B60H 1/00364* (2013.01); *B60H 1/00428* (2013.01);
(Continued)

(58) Field of Classification Search
CPC . B60H 1/3232; B60H 1/00364; F25D 29/003; H02J 3/32; H02J 2310/46
See application file for complete search history.

(56) References Cited

U.S. PATENT DOCUMENTS

| 5,501,083 A | 3/1996 | Kim |
| 6,628,011 B2 | 9/2003 | Droppo et al. |
| (Continued) | | |

FOREIGN PATENT DOCUMENTS

| CA | 2865612 A1 | 3/2016 |
| CN | 102308452 A | 1/2012 |
| (Continued) | | |

OTHER PUBLICATIONS

ISR/WO, Issued Dec. 12, 2019, 7 pages.

*Primary Examiner* — Tavia Sullens
(74) *Attorney, Agent, or Firm* — CANTOR COLBURN LLP

(57) ABSTRACT

A power system architecture configured to power a transport refrigeration system (20) based on a determined an AC power requirement. The system (20) includes a generator power converter (164) configured to receive the generator three phase AC power (163) from an AC generator (162), and provide a generator DC power (165). The system (20) also includes a grid power converter (184) configured to receive the grid three phase AC power from a grid power source (182), and provide a grid DC power (185), an energy storage device (152), the energy storage device (152) operable to provide a DC power (157) and connected to a variable DC bus, and a power management system (190) operably connected to direct power (195) the TRU (26) based on at least the AC power requirement.

8 Claims, 9 Drawing Sheets

(51) Int. Cl.
*F25D 29/00* (2006.01)
*H02J 1/10* (2006.01)
*H02J 3/32* (2006.01)
*H02J 7/14* (2006.01)

(52) U.S. Cl.
CPC ............ *F25D 29/003* (2013.01); *H02J 1/102* (2013.01); *H02J 3/32* (2013.01); *H02J 7/1415* (2013.01); *B60H 2001/3261* (2013.01); *B60H 2001/3292* (2013.01); *H02J 2310/46* (2020.01)

(56) References Cited

U.S. PATENT DOCUMENTS

| | | | |
|---|---|---|---|
| 6,688,125 | B2 | 2/2004 | Okamoto et al. |
| 7,207,183 | B2 | 4/2007 | Crane et al. |
| 7,573,145 | B2 | 8/2009 | Peterson |
| 7,977,900 | B2 | 7/2011 | Nakagami et al. |
| 8,115,334 | B2 | 2/2012 | Vyas et al. |
| 8,324,846 | B2 | 12/2012 | Marchand et al. |
| 9,389,007 | B1 | 7/2016 | McKay |
| 9,464,839 | B2 | 10/2016 | Rusignuolo et al. |
| 9,562,715 | B2 | 2/2017 | Kandasamy |
| 9,689,598 | B2 | 6/2017 | Truckenbrod et al. |
| 9,705,324 | B2 | 7/2017 | Bala |
| 9,776,473 | B2 | 10/2017 | Kolda et al. |
| 9,898,018 | B2 | 2/2018 | Zubieta et al. |
| 9,948,108 | B2 | 4/2018 | Eren et al. |
| 9,969,273 | B2 | 5/2018 | Rozman et al. |
| 9,975,403 | B2 | 5/2018 | Rusignuolo et al. |
| 10,046,641 | B2 | 8/2018 | Penmetsa et al. |
| 2007/0151272 | A1 | 7/2007 | Cosan et al. |
| 2009/0045782 | A1 | 2/2009 | Datta et al. |
| 2011/0110791 | A1* | 5/2011 | Donnat ................ B60H 1/3232 417/18 |
| 2012/0310414 | A1 | 12/2012 | Hoff et al. |
| 2012/0318014 | A1* | 12/2012 | Huff ........................ F25B 49/02 62/509 |
| 2013/0121844 | A1 | 5/2013 | Knowles |
| 2014/0232196 | A1 | 8/2014 | Cameron |
| 2015/0214787 | A1 | 7/2015 | Gerhardinger et al. |
| 2016/0065079 | A1 | 3/2016 | Bai et al. |
| 2017/0133852 | A1 | 5/2017 | MacDonald |
| 2017/0349078 | A1 | 12/2017 | Dziuba et al. |
| 2018/0191281 | A1 | 7/2018 | Zhong |

FOREIGN PATENT DOCUMENTS

| | | |
|---|---|---|
| CN | 104007781 A | 8/2014 |
| CN | 104859402 A | 8/2015 |
| CN | 105751851 A | 7/2016 |
| CN | 106042824 A | 10/2016 |
| EP | 1935712 A1 | 6/2008 |
| JP | H0490472 A | 3/1992 |
| JP | 2002081825 A | 3/2002 |
| KR | 101451787 B1 | 10/2014 |
| KR | 1020170118285 A | 10/2017 |
| WO | 2008094148 A1 | 8/2008 |
| WO | 2018100398 A1 | 6/2018 |
| WO | 2018136738 A2 | 7/2018 |
| WO | 2018226389 A1 | 12/2018 |

\* cited by examiner

ELECTRICAL ARCHITECTURE FOR POWERING TRANSPORTATION REFRIGERATION UNIT

CROSS REFERENCE TO RELATED APPLICATIONS

This application is a National Stage application of PCT/US2019/051963, filed Sep. 19, 2019, which claims the benefit of U.S. Provisional Patent Application No. 62/738,689, filed Sep. 28, 2018, both of which are incorporated by reference in their entirety herein.

BACKGROUND

The subject matter disclosed herein generally relates to transportation refrigeration units, and more specifically to an apparatus and a method for powering transportation refrigeration unit with a generator and an energy storage device.

Traditional refrigerated cargo trucks or refrigerated tractor trailers, such as those utilized to transport cargo via sea, rail, or road, is a truck, trailer or cargo container, generally defining a cargo compartment, and modified to include a refrigeration system located at one end of the truck, trailer, or cargo container. Refrigeration systems typically include a compressor, a condenser, an expansion valve, and an evaporator serially connected by refrigerant lines in a closed refrigerant circuit in accord with known refrigerant vapor compression cycles. A power unit, such as a combustion engine, drives the compressor of the refrigeration unit, and may be diesel powered, natural gas powered, or other type of engine. In many tractor trailer transport refrigeration systems, the compressor is driven by the engine shaft either through a belt drive or by a mechanical shaft-to-shaft link. In other systems, the engine of the refrigeration unit drives a generator that generates electrical power, which in-turn drives the compressor.

With current environmental trends, improvements in transportation refrigeration units are desirable particularly toward aspects of efficiency, sound and environmental impact. With environmentally friendly refrigeration units, improvements in reliability, cost, and weight reduction is also desirable.

BRIEF SUMMARY

According to one embodiment, described herein is power system architectures configured to power a transport refrigeration system based on a determined an AC power requirement. The system includes a generator power converter configured to receive a generator three phase AC power from an alternating current (AC) generator operably coupled to an axle or wheel hub, and provide a generator DC power. The system also includes a grid power converter configured to receive a grid three phase AC power from a grid power source, the grid power converter operable to provide a grid DC power, an energy storage device, the energy storage device operable to provide a DC power and connected to a DC bus, and a power management system operably connected to direct power the transport refrigeration unit TRU based on at least the AC power requirement.

In addition to one or more of the features described above, or as an alternative, further embodiments may include a DC/DC converter operably connected to a variable DC bus, the DC/DC converter configured to convert a variable DC power to a fixed DC power on a fixed DC bus.

In addition to one or more of the features described above, or as an alternative, further embodiments may include that the generator power converter is configured to receive a first three phase AC power provided by the AC generator and transmit a generator DC power to one of a fixed DC bus or a variable DC bus.

In addition to one or more of the features described above, or as an alternative, further embodiments may include that the generator power converter includes an AC/DC converter and the generator three phase AC power exhibits a first AC voltage and a first AC current, at a first frequency, and generator DC power exhibits a second DC voltage and a second DC current.

In addition to one or more of the features described above, or as an alternative, further embodiments may include that the generator power converter includes a voltage control function, and a current control function, wherein at least the voltage control function is responsive at least in part to the AC power requirement.

In addition to one or more of the features described above, or as an alternative, further embodiments may include that the grid power converter is configured to receive a first three phase AC power provided by the grid power source and transmit a grid DC power to one of a fixed DC bus or a variable DC bus.

In addition to one or more of the features described above, or as an alternative, further embodiments may include that the grid power converter includes an AC/DC converter and the grid three phase AC power exhibits a grid AC voltage and a grid AC current, at a grid frequency, and grid DC power exhibits a grid DC voltage and a grid DC current.

In addition to one or more of the features described above, or as an alternative, further embodiments may include that the grid power converter includes a voltage control function, and a current control function, wherein at least the voltage control function is responsive at least in part to the AC power requirement.

In addition to one or more of the features described above, or as an alternative, further embodiments may include that the energy storage system includes an energy storage device and at least one of an first energy storage system DC/DC converter configured to provide DC power to the power management system based at least in part on the AC power requirement and a second energy storage system DC/DC converter configured to convert at least a portion of the DC power on the fixed DC bus to supply the variable DC bus and the energy storage device.

In addition to one or more of the features described above, or as an alternative, further embodiments may include a battery management system operably connected to the TRU controller and configured to monitor at least a state of charge of the energy storage device.

In addition to one or more of the features described above, or as an alternative, further embodiments may include that the energy storage system DC/DC converter and the second energy storage system DC/DC converter are integrated and wherein the first energy storage system DC/DC converter is operably connected to the TRU controller and configured to direct power flows to the fixed DC bus and the power management system and from the fixed DC bus to the variable DC bus based on at least one of the AC power requirement and the state of charge of the energy storage device.

In addition to one or more of the features described above, or as an alternative, further embodiments may include that the energy storage device comprises at least one of a battery, fuel cell, and flow battery.

In addition to one or more of the features described above, or as an alternative, further embodiments may include that the power management system is configured to receive a DC power from one of the fixed DC bus and the variable DC bus, and to provide a second three phase AC power to the TRU based at least on the AC power requirement.

In addition to one or more of the features described above, or as an alternative, further embodiments may include that the power management system includes a DC/AC converter and the second three phase AC power exhibits a second three phase AC voltage and a second AC current, at a second frequency.

In addition to one or more of the features described above, or as an alternative, further embodiments may include that the grid power converter, generator power converter, energy storage device, and power management system are operably connected to the variable DC bus.

In addition to one or more of the features described above, or as an alternative, further embodiments may include that the grid power converter, generator power converter, the power management system, and energy storage system DC/DC converter are operably connected to the fixed DC bus, and the energy storage system DC/DC converter and energy storage device are operably connected to the variable DC bus.

In addition to one or more of the features described above, or as an alternative, further embodiments may include that the grid power converter and power management system and energy storage system DC/DC converter are connected to the fixed DC bus, and the energy storage system DC/DC converter and generator power converter and energy storage device are operably connected to the variable DC bus.

In addition to one or more of the features described above, or as an alternative, further embodiments may include that the grid power converter, the generator power converter, energy storage system DC/DC converter and energy storage device are connected to the variable DC bus, and the energy storage system DC/DC converter and the power management system are operably connected to the fixed DC bus.

In addition to one or more of the features described above, or as an alternative, further embodiments may include that the grid power converter, power management system, the energy storage system DC/DC converter, and energy storage device are connected to the variable DC bus, and the energy storage system DC/DC converter and the generator power converter are operably connected to the fixed DC bus.

In addition to one or more of the features described above, or as an alternative, further embodiments may include that the grid power converter, the generator power converter, the energy storage system DC/DC converter are connected to the fixed DC bus, and the energy storage system DC/DC converter, the energy storage device, and the power management system are operably connected to the variable DC bus.

In addition to one or more of the features described above, or as an alternative, further embodiments may include that the grid power converter, and the energy storage system DC/DC converter are connected to the fixed DC bus, and the energy storage system DC/DC converter, the generator power converter, the energy storage device, and the power management system are operably connected to the variable DC bus.

In addition to one or more of the features described above, or as an alternative, further embodiments may include that the generator power converter and power management system and energy storage system DC/DC converter are connected to the fixed DC bus, and the energy storage system DC/DC converter and grid power converter and energy storage device are operably connected to the variable DC bus.

In addition to one or more of the features described above, or as an alternative, further embodiments may include a return air temperature (RAT) sensor disposed in the return airflow and configured measure the temperature of the return airflow, the RAT sensor operably connected to the TRU controller, the TRU controller configured to execute a process to determine the AC power requirement for the TRU based at least in part on the RAT.

Also described herein in an embodiment is a method of generating and directing power to a transportation refrigeration unit system having a compressor configured to compress a refrigerant, an evaporator heat exchanger operatively coupled to the compressor; an evaporator fan configured to provide return airflow from a return air intake and flow the return airflow over the evaporator heat exchanger and a TRU controller operable to execute the method. The method includes determining an AC power requirement for the TRU, providing a generator DC power from a generator power converter operably connected an alternating current (AC) generator operably connected to an axle or wheel hub, and providing a grid DC power from a grid power converter operably connected to a grid power source providing a grid three phase AC power. The method also includes providing a DC power from a variable DC bus to a power management system, the variable DC bus operably connected an energy storage device and directing by a power management system, a three phase AC power the TRU, the power management system operably connected to the TRU, the directing based at least in part on the AC power requirement.

In addition to one or more of the features described above, or as an alternative, further embodiments may include that the energy storage device includes a battery system.

Technical effects of embodiments of the present disclosure include a transportation refrigeration unit coupled to and powered by an external generator system via a generator power converter, where the power generated by the generator and converted by the generator power converter is based on an AC power requirement of the transportation refrigeration unit.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The subject matter which is regarded as the disclosure is particularly pointed out and distinctly claimed in the claims at the conclusion of the specification. The foregoing and other features and advantages of the disclosure are apparent from the following detailed description taken in conjunction with the accompanying drawings in which:

The following descriptions should not be considered limiting in any way. With reference to the accompanying drawings, like elements are numbered alike:

DETAILED DESCRIPTION

A detailed description of one or more embodiments of the disclosed apparatus and method are presented herein by way of exemplification and not limitation with reference to the Figures.

Figure 1:
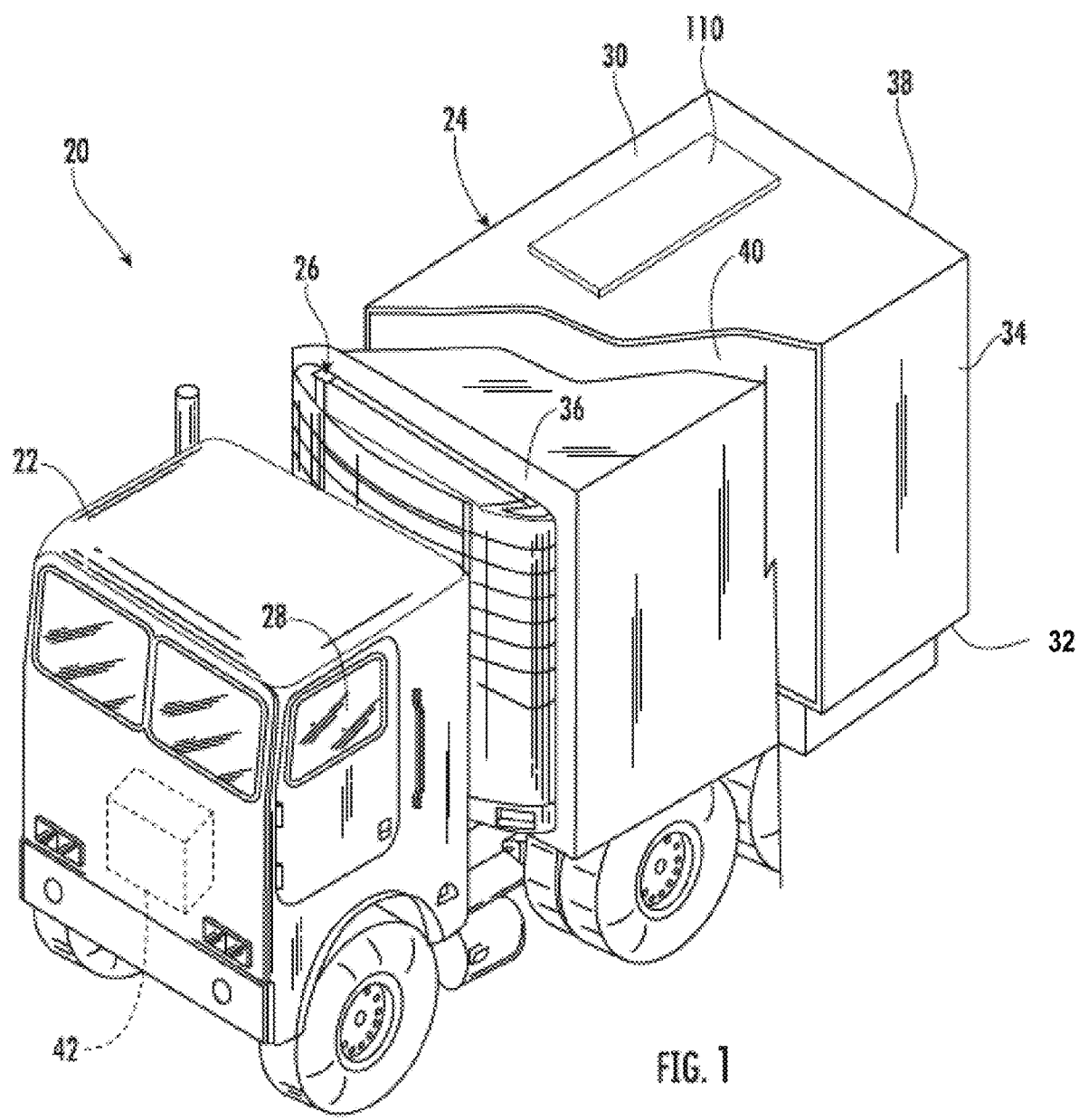
FIG. 1 is a perspective view of a transportation refrigeration system having a transportation refrigeration unit as one, non-limiting, according to an embodiment of the present disclosure.

Referring to FIG. 1, a transport refrigeration system 20 of the present disclosure is illustrated. In the illustrated embodiment, the transport refrigeration systems 20 may include a tractor or vehicle 22, a container 24, and an engineless transportation refrigeration unit (TRU) 26. The container 24 may be pulled by a vehicle 22. It is understood that embodiments described herein may be applied to shipping containers that are shipped by rail, sea, air, or any other suitable container, thus the vehicle may be a truck, train, boat, airplane, helicopter, etc.

The vehicle 22 may include an operator's compartment or cab 28 and a combustion engine 42 which is part of the powertrain or drive system of the vehicle 22. In some instances, the vehicle 22 may be a hybrid or all electric configuration having electric motors to provide propulsive force for the vehicle. In some configurations, the TRU system 26 may be engineless. In some embodiments, a small engine or the engine of the vehicle 22 may be employed to power or partially power the TRU 26. The container 24 may be coupled to the vehicle 22 and is thus pulled or propelled to desired destinations. The trailer may include a top wall 30, a bottom wall 32 opposed to and spaced from the top wall 30, two side walls 34 spaced from and opposed to one-another, and opposing front and rear walls 36, 38 with the front wall 36 being closest to the vehicle 22. The container 24 may further include doors (not shown) at the rear wall 38, or any other wall. The walls 30, 32, 34, 36, 38 together define the boundaries of a cargo compartment 40. Typically, transport refrigeration systems 20 are used to transport and distribute cargo, such as, for example perishable goods and environmentally sensitive goods (herein referred to as perishable goods). The perishable goods may include but are not limited to fruits, vegetables, grains, beans, nuts, eggs, dairy, seed, flowers, meat, poultry, fish, ice, blood, pharmaceuticals, or any other suitable cargo requiring cold chain transport. In the illustrated embodiment, the TRU 26 is associated with a container 24 to provide desired environmental parameters, such as, for example temperature, pressure, humidity, carbon dioxide, ethylene, ozone, light exposure, vibration exposure, and other conditions to the cargo compartment 40. In further embodiments, the TRU 26 is a refrigeration system capable of providing a desired temperature and humidity range.

Figure 2:
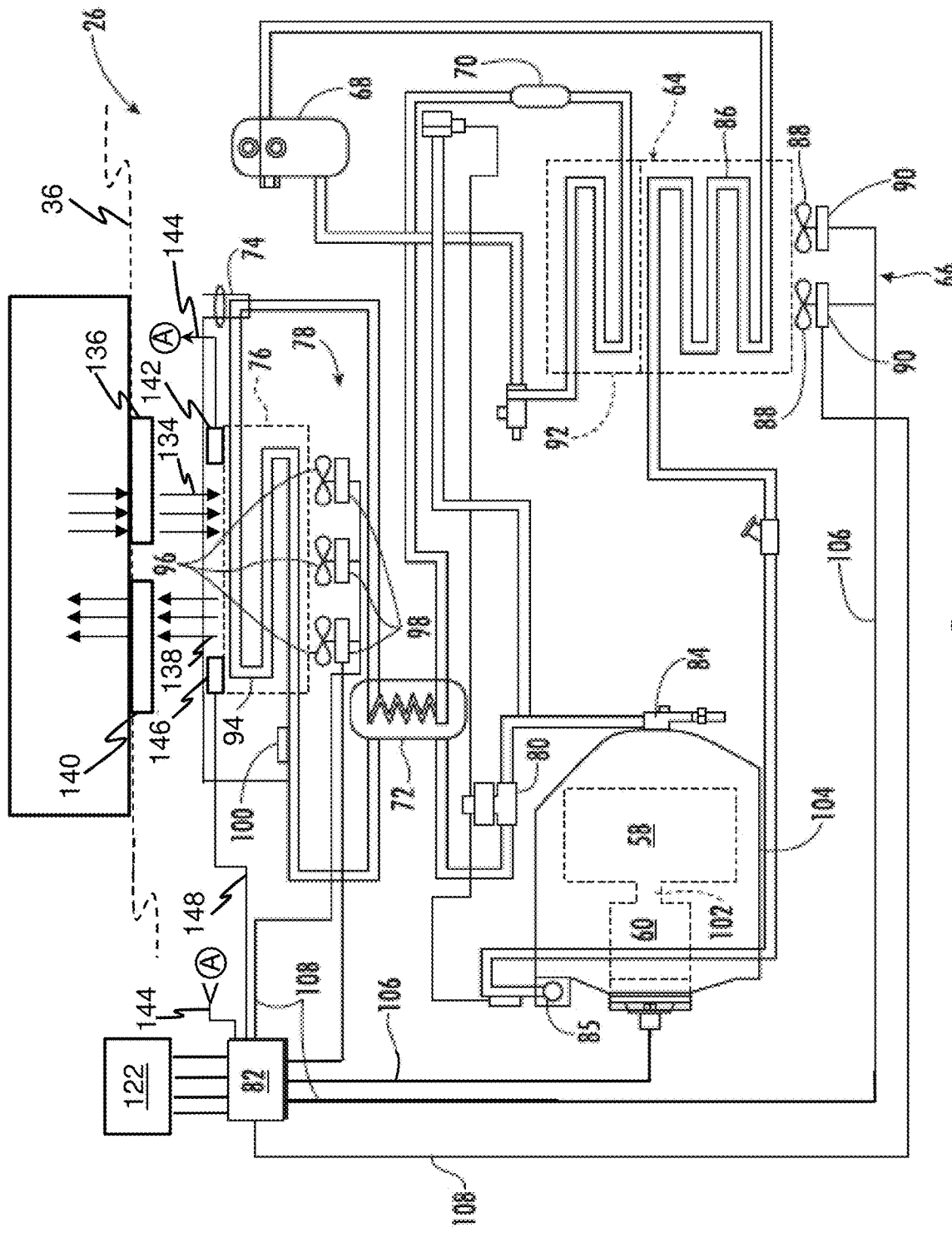
FIG. 2 is a schematic of the transportation refrigeration unit, according to an embodiment of the present disclosure.

Referring to FIGS. 1 and 2, the container 24 is generally constructed to store a cargo (not shown) in the compartment 40. The engineless TRU 26 is generally integrated into the container 24 and may be mounted to the front wall 36. The cargo is maintained at a desired temperature by cooling of the compartment 40 via the TRU 26 that circulates refrigerated airflow into and through the cargo compartment 40 of the container 24. It is further contemplated and understood that the TRU 26 may be applied to any transport compartments (e.g., shipping or transport containers) and not necessarily those used in tractor trailer systems. Furthermore, the transport container 24 may be a part of the of the vehicle 22 or constructed to be removed from a framework and wheels (not shown) of the container 24 for alternative shipping means (e.g., marine, railroad, flight, and others).

The components of the engineless TRU 26 may include a compressor 58, an electric compressor motor 60, a condenser 64 that may be air cooled, a condenser fan assembly 66, a receiver 68, a filter dryer 70, a heat exchanger 72, an expansion valve 74, an evaporator 76, an evaporator fan assembly 78, a suction modulation valve 80, and a controller 82 that may include a computer-based processor (e.g., microprocessor) and the like as will be described further herein. Operation of the engineless TRU 26 may best be understood by starting at the compressor 58, where the suction gas (e.g., natural refrigerant, hydro-fluorocarbon (HFC) R-404a, HFC R-134a . . . etc.) enters the compressor 58 at a suction port 84 and is compressed to a higher temperature and pressure. The refrigerant gas is emitted from the compressor 58 at an outlet port 85 and may then flow into tube(s) 86 of the condenser 64.

Air flowing across a plurality of condenser coil fins (not shown) and the tubes 86, cools the gas to its saturation temperature. The air flow across the condenser 64 may be facilitated by one or more fans 88 of the condenser fan assembly 66. The condenser fans 88 may be driven by respective condenser fan motors 90 of the fan assembly 66 that may be electric. By removing latent heat, the refrigerant gas within the tubes 86 condenses to a high pressure and high temperature liquid and flows to the receiver 68 that provides storage for excess liquid refrigerant during low temperature operation. From the receiver 68, the liquid refrigerant may pass through a sub-cooler heat exchanger 92 of the condenser 64, through the filter-dryer 70 that keeps the refrigerant clean and dry, then to the heat exchanger 72 that increases the refrigerant sub-cooling, and finally to the expansion valve 74.

As the liquid refrigerant passes through the orifices of the expansion valve 74, some of the liquid vaporizes into a gas (i.e., flash gas). Return air from the refrigerated space (i.e., cargo compartment 40) flows over the heat transfer surface of the evaporator 76. As the refrigerant flows through a plurality of tubes 94 of the evaporator 76, the remaining liquid refrigerant absorbs heat from the return air, and in so doing, is vaporized and thereby cools the return air.

The evaporator fan assembly 78 includes one or more evaporator fans 96 that may be driven by respective fan motors 98 that may be electric. The air flow across the evaporator 76 is facilitated by the evaporator fans 96. From the evaporator 76, the refrigerant, in vapor form, may then flow through the suction modulation valve 80, and back to the compressor 58. The expansion valve 74 may be thermostatic or electrically adjustable. In an embodiment, as depicted, the expansion valve 74 is thermostatic. A thermostatic expansion valve bulb sensor 100 may be located proximate to an outlet of the evaporator tube 94. The bulb sensor 100 is intended to control the thermostatic expansion valve 74, thereby controlling refrigerant superheat at an outlet of the evaporator tube 94. It is further contemplated and understood that the above generally describes a single stage vapor compression system that may be used for HFCs such as R-404a and R-134a and natural refrigerants such as propane and ammonia. Other refrigerant systems may also be applied that use carbon dioxide ($CO_2$) refrigerant, and that may be a two-stage vapor compression system. In another embodiment, the expansion valve 74 could be an electronic expansion valve. In this case the expansion valve is commanded to a selected position by the controller 82 based on the operating conditions of the vapor compression cycle and the demands of the system.

A bypass valve (not shown) may facilitate the flash gas of the refrigerant to bypass the evaporator 76. This will allow the evaporator coil to be filled with liquid and completely 'wetted' to improve heat transfer efficiency. With $CO_2$ refrigerant, this bypass flash gas may be re-introduced into a mid-stage of a two-stage compressor 58.

The compressor 58 and the compressor motor 60 may be linked via an interconnecting drive shaft 102. The compressor 58, the compressor motor 60 and the drive shaft 102 may all be sealed within a common housing 104. The compressor 58 may be a single compressor. The single compressor may be a two-stage compressor, a scroll-type compressor or other compressors adapted to compress HFCs or natural refrigerants. The natural refrigerant may be $CO_2$, propane, ammonia, or any other natural refrigerant that may include a global-warming potential (GWP) of about one (1).

Continuing with FIG. 2, and with continued reference to FIG. 1, FIG. 2 also illustrates airflow through the TRU 26 and the cargo compartment 40. Airflow is circulated into and through and out of the cargo compartment 40 of the container 24 by means of the TRU 26. A return airflow 134 flows into the TRU 26 from the cargo compartment 40 through a return air intake 136, and across the evaporator 76 via the fan 96, thus conditioning the return airflow 134 to a selected or predetermined temperature. The conditioned return airflow 134, now referred to as supply airflow 138, is supplied into the cargo compartment 40 of the container 24 through the refrigeration unit outlet 140, which in some embodiments is located near the top wall 30 of the container 24. The supply airflow 138 cools the perishable goods in the cargo compartment 40 of the container 24. It is to be appreciated that the TRU 26 can further be operated in reverse to warm the container 24 when, for example, the outside temperature is very low.

A temperature sensor 142 (i.e., thermistor, thermocouples, RTD, and the like) is placed in the air stream, on the evaporator 76, at the return air intake 136, and the like, to monitor the temperature return airflow 134 from the cargo compartment 40. A sensor signal indicative of the return airflow temperature denoted RAT is operably connected via line 144 to the TRU controller 82 to facilitate control and operation of the TRU 26. Likewise, a temperature sensor 146 is placed in the supply airflow 138, on the evaporator 76, at the refrigeration unit outlet 140 to monitor the temperature of the supply airflow 138 directed into the cargo compartment 40. Likewise, a sensor signal indicative of the supply airflow temperature denoted SAT 14 is operably connected via line 148 to the TRU controller 82 to facilitate control and operation of the TRU 26.

System

Figure 3:
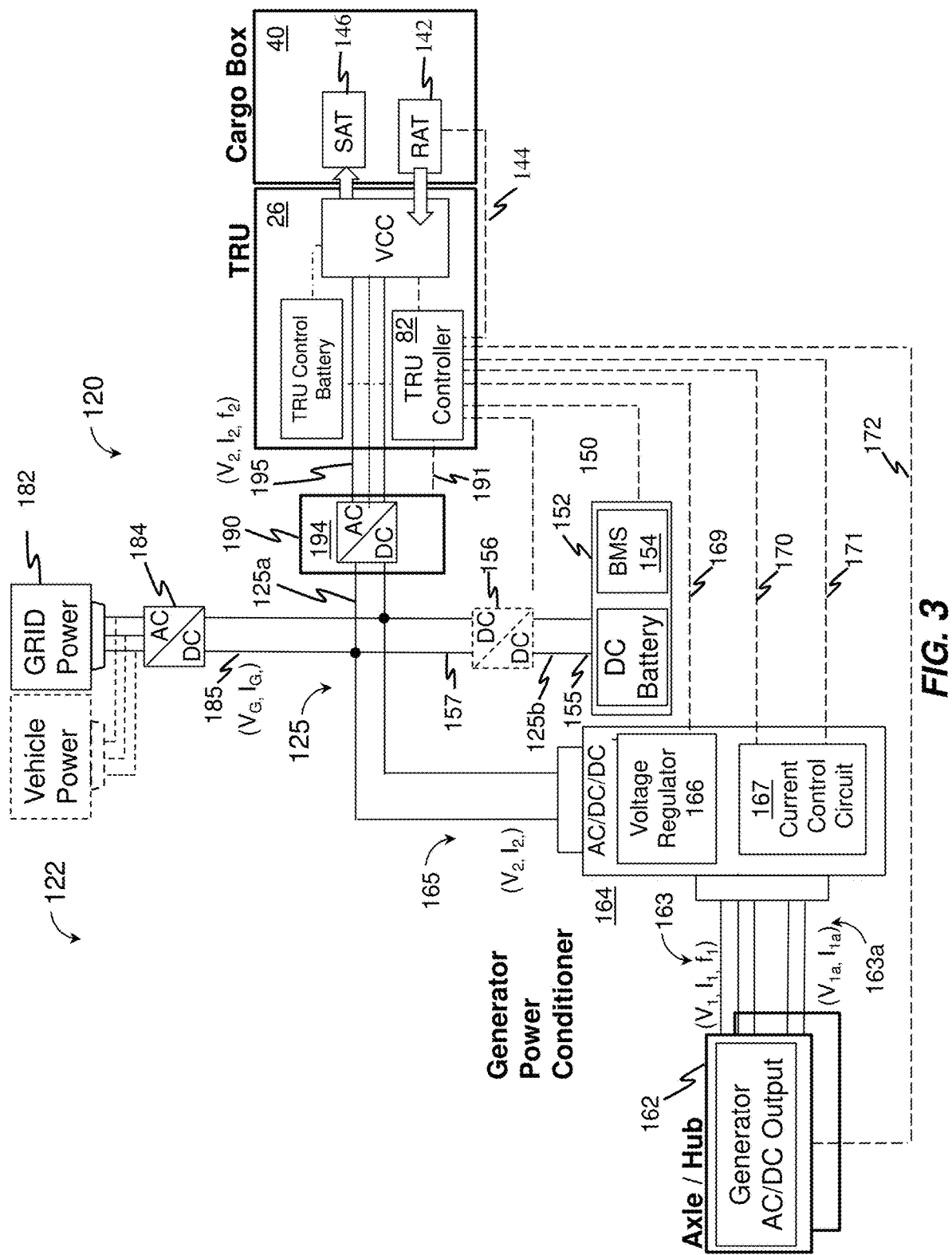
FIG. 3 is a block diagram of a transportation refrigeration unit and power system, according to an embodiment of the present disclosure.

Referring now to FIG. 3, with continued reference to FIGS. 1 and 2 as well, the TRU 26 may include or be operably interfaced with a power supply interface shown generally as 120. The power supply interface 120 may include, interfaces to/from various power sources denoted generally as 122 and more specifically as follows herein as well as one or more DC busses shown generally as 125 and more specifically 125a, 125b, . . . 125n. In an embodiment, the power sources 122 may include, but not be limited to an energy storage device 152, generator 162, and grid power, 182. Each of the power sources 122 may be configured to selectively power the TRU 26 as described further herein, including compressor motor 60, the condenser fan motors 90, the evaporator fan motors 98, the controller 82, and other components 99 of the TRU 26 that may include various solenoids and/or sensors). The controller 82 through a series of data and command signals over various pathways 108 may, for example, control the application of power to the electric motors 60, 90, 98 as dictated by the cooling needs of the TRU 26.

The engineless TRU 26 may include an AC or DC architecture with selected components employing alternating current (AC), and others employing direct current (DC). For example, in an embodiment, the motors 60, 90, 98 may be configured as AC motors, while in other embodiments, the motors 60, 90, 98 may be configured as DC motors. The operation of the of the power sources 122 as they supply power to the TRU 26 may be managed and monitored by the TRU controller 82 and interfaced from the DC bus 125 to the power management system 190. The power management system 190 is configured direct the power from the various power sources 122, and the like, via DC bus 125 based on various requirements of the TRU 26. In an embodiment, the TRU controller 82 receives various signals indicative of the operational state of the TRU 26 and determines the power requirements for the TRU system 26 accordingly and directs the components of the power supply interface 120 and specifically the power management system 190 to direct power accordingly to address the requirements of the TRU 26.

In one embodiment, the TRU system 26 is controlled to a temperature setpoint value selected by the user. The TRU controller 82 monitors the RAT and optionally the SAT as measured by the temperature sensors 142 and 146 respectively. The TRU controller 82 estimates the power requirements for the TRU 26 based on the RAT (among others) and provides commands accordingly to the various components of the power supply interface 120 and specifically the power management system 190, energy storage system 150, and generator power converter 164 to manage the generation, conversion, and routing of power in the power supply interface 120 and TRU system 26. By using the measured RAT and the setpoint value, an estimate to power demand is made. More specifically, in one embodiment, if the (RAT-setpoint value) is above a first threshold (e.g., >10 degrees F.), then full power (e.g., at a known voltage supply, current demand is known) is needed by the TRU system 26. If the (RAT-setpoint value) is between first threshold and second threshold, current requirement is limited (at known voltage) to achieve a mid-range power (e.g., ~50% power or something less than 100%). If the (RAT-setpoint value) is below second threshold, current is limited (at voltage) to achieve a minimum power (e.g., ~20% power).

The TRU controller 82 is configured to control the components in the TRU 26 as well as the components of the power supply interface 120 in accordance with operating needs of the transport refrigeration system 20. The TRU controller 82 is communicatively coupled to the power management system 190, the grid power source 182, the energy storage system 150, and the generator power converter 164 or generator 162. For the TRU power demand, the TRU controller 82, using additional information from each of the power sources 122 provides instructions to affect the grid power source 182 output, the generator 162 and generator power converter 164 output, the charge/discharge of the energy storage system 150, all to enable and configure providing power as required by the TRU 26. Additionally, the TRU controller 82 provides instructions for various components in the power supply interface 120 to manage the power flow to the DC Bus 125 and thereby to the power management system 190 depending upon the operational status of the various power sources (i.e. grid power 182, energy storage device 152 and generator 162) and as based on the TRU 26 power demand.

In an embodiment, the power management system 190 includes a DC/AC converter 194. The DC/AC converter 194 is configured to receive DC power on the DC bus 125 denoted in this instance 125*a* (e.g., second DC voltage $V_2$, a second DC current $I_2$ from the generator power converter 165; and/or $V_G$, $I_G$ 185; and/or DC voltage 155 from the energy storage device 152; alone or as combined) and generate three phase AC power 195 (e.g., at AC voltage $V_2$, AC current $I_2$ a frequency $f_2$), for providing power to the TRU system 26. In an embodiment, the DC/AC converter 194 includes a voltage control function, a current control function, and a frequency control function, each configured to facilitate the conversion. In an embodiment, the TRU controller 82 provides command signals denoted by line 191, to the power management system 190. The commands are based, at least, on the power consumption requirements of the TRU 26 as discussed further herein. In addition, the TRU controller 82 may receive status information also depicted by line 191 regarding the DC/AC converter 194. In an embodiment, the communications may be over standard communication interfaces such as CAN, RS-485, and the like. Moreover, as is discussed further herein, the communications may be wired or wireless.

As described further herein, there are three power sources 122 grid power 182, generator 162/generator power converter 164 and energy storage device 152. If the TRU 26 is "On" and operating, the TRU controller 82 knows, the power requirements for the TRU system 26, and thereby, what power is needed. The TRU controller 82 is also programmed to ascertain whether or not grid power (e.g., 182) is available or not. If the grid power is available and TRU is On and energy storage device 152 (e.g., battery) SOC indicates a full charge, grid power will satisfy TRU system 26 power demand. Conversely, if grid power 182 is available and TRU On and the energy storage device is not fully charged, TRU power demand is satisfied as first priority and then DC/DC converter 156 is be activated to provide necessary charging to energy storage device 152 as second priority. Moreover, if grid power 182 is available and TRU is "Off" and the energy storage device 152 is not fully charged, the DC/DC converter 156 will be activated to provide necessary charging current. If grid power 182 is not available and generator/generator power converter 162/164 is not operable, all TRU power demand is satisfied by the energy storage system 150 via the energy storage device 152. Finally, if grid power 182 is not available and generator/generator power converter 162/164 is operable, then TRU power demand is satisfied by both the generator 162 & energy storage system 150.

As described herein, in operation, the TRU controller 82 identifies the power requirements for the TRU 26 at least partially based on the RAT. The TRU controller 82 conveys the power requirements to the power management system 190 and/or the generator power converter 164 to convert the first three phase AC power 163 or first DC power 163*a* to the second DC power 165 as necessary to satisfy the requirements of the TRU 26 and the energy storage system 150 and specifically the charging requirements of the energy storage device 152.

The DC bus 125 and thereby, the power management system 190 may receive power from a grid power source 182 when it is available. In an embodiment the grid power source 182 is interfaced to the DC bus 125 and the power management system 190 via a grid power converter 184. In an embodiment, the power management system 190 may be a stand-alone unit, or integral with the TRU 26. The grid power source 182 is generally conventional three phase AC power 220/480 VAC at 60 or 400 Hz. In an embodiment, the grid power converter 184 is a conventional AC/DC converter operable to convert the three phase AC power from the grid power source 182 to a DC voltage and current. The grid power converter 184 in one or more embodiments generates a grid DC power 185 including DC voltage $V_G$, and DC current $I_G$. The grid DC power 185 and is transmitted from the grid power converter 184 to the DC bus 125 and the power management system 190 or otherwise as described herein.

The DC bus 125 and power management system 190 receives power from a generator 162 directly and/or via a generator power converter 164. The generator 162 can be axle or hub mounted configured to recover rotational energy when the transport refrigeration system 20 is in motion and convert that rotational energy to electrical energy, such as, for example, when the axle of the vehicle 22 is rotating due to acceleration, cruising, or braking. In an embodiment, the generator 162 is configured to provide a first three phase AC power 163 comprising voltage $V_1$, an AC current $I_1$ at a given frequency $f_1$ denoted by reference numeral 163. The generator 162 may be asynchronous or synchronous. In another embodiment, the generator 162 may be DC, providing a first DC power 163a including a DC voltage and DC current denoted as $V_{1a}$, and DC current $I_{1a}$. The generator power converter 164 in one or more embodiments generates a second DC power 165 including DC voltage $V_2$, and DC current $I_2$. The second DC power 165 and is transmitted from the generator power converter 164 to the DC bus 125 and thereby the power management system 190 or otherwise as described herein.

Energy Storage System

Continuing with FIG. 3 and the architecture of the power supply interface 120 and the various power sources 122 employed to power the TRU 26 and the components thereof. In an embodiment, one of the power sources 122 may include, but not be limited to an energy storage system 150 operably coupled to the power management system 190. The energy storage system 150 transmits DC power 155 via DC bus 125b to, and receives DC power 157 from the DC bus 125. The energy storage system 150 may include, but not be limited to the energy storage device 152, and a battery management system 154. In an embodiment, the battery management system 154 is a part of, and integral with, the energy storage device 152. In this embodiment DC bus 125a and 125b are directly connected.

In an embodiment the DC voltages from the power sources 122 including DC voltage 185 from the grid power source 182 and/or DC voltage $V_2$, $I_2$ 165 from the generator power converter 164 combines to form the DC voltage on the and current on bus 125a, 125b which is directly coupled to the energy storage device 152 to the to charge and store energy on the energy storage device 152. Conversely, in other embodiments, for example when grid power source 182 is not available, the energy storage device 152 supplies DC voltage and current 155 directly to the DC bus 125b, 125a and the power management system 190 for powering the TRU 26. In another embodiment, the energy storage system 150 further includes a DC/DC converter 156. In one embodiment, the DC bus 125, and more specifically 125a provides DC power 157 to a DC/DC converter 156 to formulate a DC voltage and current 155 on DC bus 125b to charge and store energy on the energy storage device 152. Conversely, in other embodiments the energy storage device 152 supplies DC voltage and current 155 via DC bus 125b to the DC/DC converter 156 operating as a DC/DC converter to supply a DC power 157 to the DC bus 125, 125a, and the power management system 190 for powering the TRU 26. It should be appreciated that as described herein, the DC/DC converter 156 is bidirectional, enabling conversions in both directions to facilitate charging and discharging the energy storage device 152. While the DC/DC converter 156 is described as bidirectional, such description is merely for the purposes of illustration. In operation, the DC/DC converter 156 may be a single integrated unit, or multiple units configured in parallel to operate in opposite directions. It is also noteworthy to appreciate that in the various embodiments described herein, numerous architectures are described based on the interconnection between the various power sources 122. More specifically, the interconnection between power sources 122, e.g., grid power source 182, generator 162 and the DC/AC converter 194 of the power management system 190 with the energy storage device 152, based on the optional application of the optional DC/DC converter 156. In the various architectures, where the energy storage device 152 is directly connected (e.g. 125a directly connected to 125b), that portion of the bus is termed variable as the voltage is capable of variation based on the state of charge of the energy storage device 152. On the other hand, in the instances where the DC/DC converter is employed, the portions of the DC bus directly connected (e.g., 125b) to the energy storage device 152 and at the input connection to the DC/DC converter are considered variable, while the portion at the output of the DC/DC converter 156 connected to the DC bus 125, (e.g., 125a) are considered fixed and regulated.

The battery management system 154 monitors the performance of the energy storage device 152. For example, monitoring the state of charge of the energy storage device 152, a state of health of the energy storage device 152, and a temperature of the energy storage device 152. Examples of the energy storage device 152 may include a battery system (e.g., a battery or bank of batteries), fuel cells, flow battery, ultracapacitors, and others devices capable of storing and outputting electric energy that may be direct current (DC). The energy storage device 152 may include a battery system, which may employ multiple batteries organized into battery banks.

If the energy storage system 150 includes a battery system for the energy storage device 152, the battery system may have a voltage potential within a range of about two-hundred volts (200V) to about six-hundred volts (600V). Generally, the higher the voltage, the greater is the sustainability of electric power which is preferred. However, with increases in the voltage, the size and weight of the battery/batteries in an energy storage device 152 increase. Increased size and weight are generally not preferred when transporting cargo. Additionally, if the energy storage device 152 is a battery, then in order to increase either voltage and/or current, the batteries need to be connected in series or parallel depending upon electrical needs. Higher voltages in a battery energy storage device 152 will require more batteries in series than lower voltages, which in turn results in bigger and heavier battery energy storage device 152. A lower voltage and higher current system may be used, however such a system may require larger cabling or bus bars. As a result, commonly the selection and integration of the energy storage device 152, in a power system requires tradeoffs between capacity current, size weight and the like. In addition, the voltage and current capability of the energy storage device 152 may also require tradeoffs on the architecture of the power system such as direct connection or employing a DC/DC converter as described herein.

In one embodiment, the energy storage device 152 may be contained within the structure 27 of the TRU 26. In an embodiment, the energy storage device 152 is located with the TRU 26, however, other configurations are possible. In another embodiment, the energy storage device 152 may be located with the container 24 such as, for example, underneath the cargo compartment 40. Likewise, the DC/DC converter 156 may be located with the container 24 such as, for example, underneath the cargo compartment 40, however, in some embodiments it may be desirable to have the DC/DC converter 156 in close proximity to the power management system 190 and/or the TRU 26 and TRU controller 82. It will be appreciated that in one or more embodiments, while particular locations are described with respect to connection and placement of selected components including the energy storage device 152 and/or DC/DC converter 156, such descriptions are merely illustrative and are not intended to be limiting. Varied location, arrangement and configuration of components is possible and within the scope of the disclosure.

The battery management system 154 and DC/DC converter 156 are operably connected to and interface with the TRU controller 82. The TRU controller 82 receives information regarding the status of energy storage system 150, including the energy storage device 152 to provide control inputs to the DC/DC converter 156 to monitor the energy storage device 152, as well as control charge and discharge rates for the energy storage device 152.

AC Gen/DC Converter

In an embodiment associated with the generator power converter 164 is an AC/DC converter and configured to receive the three phase AC power 163 (e.g., at AC voltage $V_1$, AC current $I_1$ a frequency $f_1$), from the generator 162 and convert it to a DC power denoted 165 comprising a second DC voltage $V_2$, a second DC current $I_2$. The second DC power 165 is transmitted from the generator power converter 164 to the DC bus 125 and power management system 190. In an embodiment, the generator power converter 164 is configured to provide the second DC power 165 based of the requirements of the TRU 26. In an embodiment, the generator power converter 164 includes a voltage control function 166, a current control function 167, are each configured to facilitate the conversion. In an embodiment, the TRU controller 82 provides command signals denoted 169, and 170 to a voltage control function 166, current control function 167, respectively. The command signals 169, and 170 are generated by the TRU controller 82 based on the power consumption requirements of the TRU 26 as discussed further herein. In addition, the TRU controller 82 may receive status information as depicted by 171, 172 regarding the generator power converter 164, and generator 162 respectively. Likewise, the generator power converter may receive control signal or provide status signals to TRU controller 82, the power management system 190, or energy storage system 150 for mode selection and diagnostic purposes. In an embodiment, the communications may be over standard communication interfaces such as CAN, RS-485, and the like. Moreover, as is discussed further herein, the communications may be wired or wireless.

In this embodiment, the generator power converter 164, the voltage control function 166 includes a voltage regulation function and is configured to monitor the output voltage from the generator 162 and maintains a constant DC voltage out of the voltage control function 166. The voltage control function 166 communicates status to the TRU Controller 82. The current control function 167 monitors and communicates to the TRU 26 the status of current draw from the generator 162. In an embodiment, the current may be limited depending on the power demands of the TRU 26. Finally, in an embodiment a frequency converter function 168 may also monitors the frequency of the three phase power 163 produced by the generator 162 to facilitate the conversion of the three phase power 163 to the second DC power 165 as determined by the voltage control function 166 and the TRU controller 82 for supply to the power management system 190 and ultimately the TRU 26. The generator power converter 164 may be a stand-alone unit configured to be in close proximity to or even integral with the generator 162.

DC Gen/DC Converter

In yet another embodiment, for example, when the generator 162 is a DC generator, the generator power converter 164 is an DC/DC converter and configured to receive DC power 163a (e.g., at DC voltage $V_{1a}$, DC current $I_{1a}$), from the generator 162 and convert it to the second DC power denoted 165a comprising a second DC voltage $V_{2a}$, a second DC current $I_{1a}$. The second DC power 165a is transmitted from the generator power converter 164 to the power management system 190. Once again, as described above, the generator power converter 164 is configured to provide the second DC power 165a based of the requirements of the TRU 26 as described above. In this embodiment, the generator power converter 164 including the voltage control function 166, and the current control function 167, are each configured to facilitate the DC/DC conversion. In this embodiment, once again the TRU controller 82 provides command signals denoted 169, and 170 to a voltage control function 166, current control function 167 respectively, based on the power consumption requirements of the TRU 26 as discussed further herein. In this embodiment, the voltage control function 166 includes a voltage regulation function and is configured to monitor the output DC voltage from the generator 162 and maintains a constant DC voltage out of the voltage control function 166 for supply to the DC bus 125 and power management system 190 and ultimately the TRU 26. The current control function 167 monitors and communicates to the TRU 26 the status of current draw from the generator 162. Once again, in an embodiment, the communications may be over standard communication interfaces such as CAN, RS-485, and the like. Moreover, as is discussed further herein, the communications may be wired or wireless.

Power Flows

Continuing with FIG. 3, as described earlier, the power supply interface 120 may include, interfaces to various power sources 122 managed and monitored by the TRU controller 82. The TRU controller 82 and the power management system 190 manages and determines electrical power flows in the power supply interface 120 based upon the operational needs of the TRU 26 and the capabilities of the components in the power supply interface 120, (e.g., generator 162, converter 164, energy storage device 152, and the like. The TRU controller determines the status of various power sources 122, controls their operation, and directs the power to and from the various power sources 122 and the like based on various requirements of the TRU 26.

In an embodiment there are five primary power flows associated with the power supply interface 120 and specifically the DC bus 125 managed by the TRU controller 82 and the power management system 190. First, the power into the/dc bus 125 supplied via the generator 162 or generator power converter 164, e.g., second DC power 165). Second, the power supplied to the DC bus 125 when operably connected to grid power source 182. Third the power supplied to the DC bus from an energy storage device 152. Fourth, the power directed from the DC bus 125 to the energy storage device 152. Finally, the DC power directed to the power management system 190 and TRU 26 from the DC bus 125.

The power flows will be transferred through different paths based on the requirements placed on the power management system 190 and particular configuration of the power supply interface 120. The DC bus 125 and the power management system 190 operates as a central power bus to connect various power sources 122 together to supply the power needs of the TRU 26. The TRU controller and power management system 190 controls switching, directing, or redirecting power to/from the five power flows as needed to satisfy the power requirements of the TRU 26.

Figure 4A:
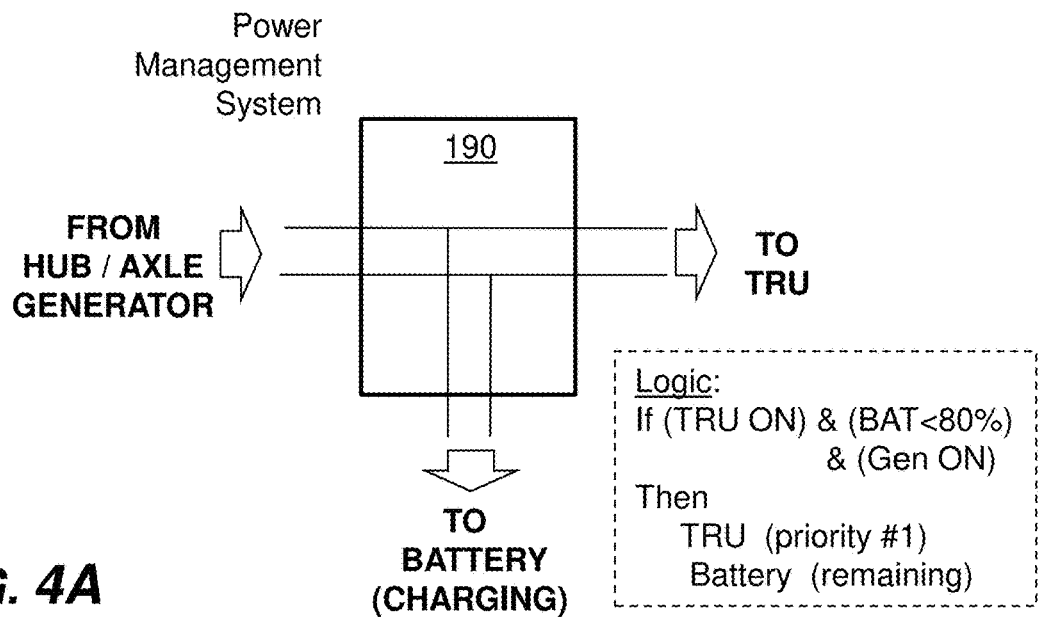
FIG. 4A depicts power flows of the power management system according to an embodiment of the present disclosure.
Figure 4B:
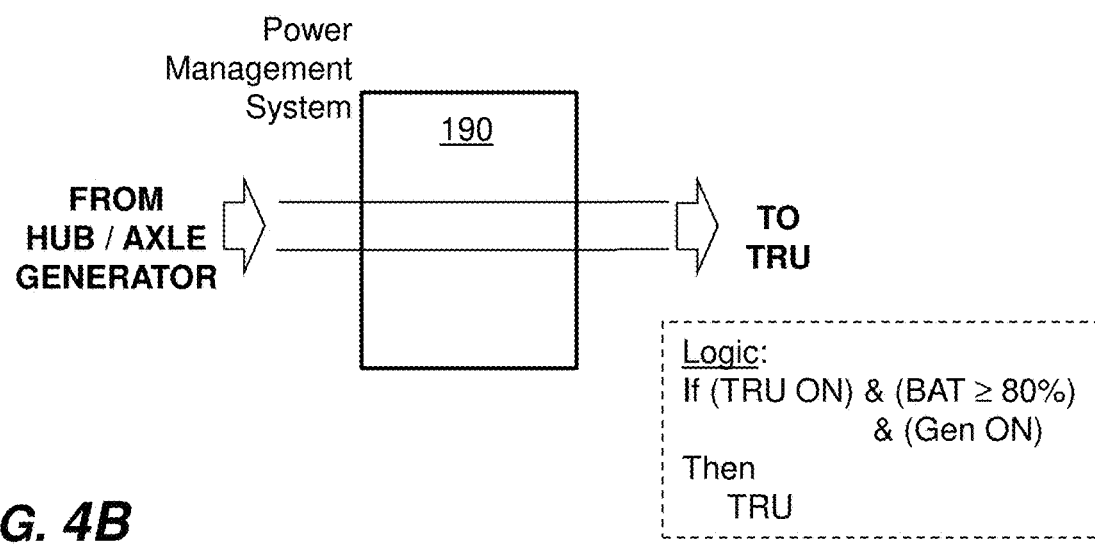
FIG. 4B depicts power flows of the power management system, according to an embodiment of the present disclosure.
Figure 4C:
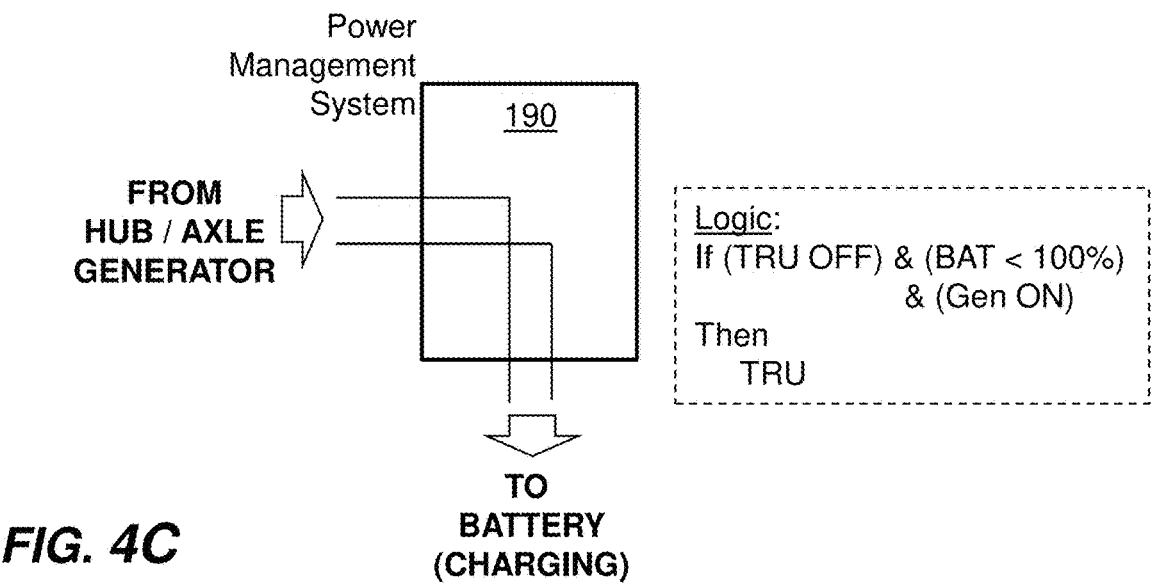
FIG. 4C depicts power flows of the power management system, according to an embodiment of the present disclosure.

Turning now to FIGS. 4A-4H each providing a simplified diagram depicting each of the various possible power flow combinations in the power supply interface 120 associated with the DC bus 125. FIGS. 4A-4C depict power flows for power supplied from the generator 162 and/or generator power converter 164 (e.g., second DC power). Referring now to FIG. 5A, in an embodiment, the logic employed by the TRU controller 82 for directing the power on the DC bus 125 and to the power management system 190 if the TRU 26 is operating. If so, and the energy storage system 150 indicates that the energy storage device 120 is exhibiting a charge state that is less than a selected threshold, then the power on the DC bus 125 is directed to the power management system 190 and thereby the TRU 26 and the energy storage system 150 for recharging the energy storage device 152. In an embodiment, priority is given to satisfying the power requirements of the TRU 26. Any remaining power may be directed to the recharging application for the energy storage system 150. It should be appreciated that while particular threshold of 80% is disclosed and employed for the described embodiments, such values and description are merely illustrative. Other values and applications for the thresholds are possible.

Referring now to FIG. 4B as well, the figure depicts a second instance for power flows for power supplied from the generator 162 and/or generator power converter 164. In this embodiment, if the TRU 26 is operating, and the energy storage system 150 indicates that the energy storage device 152 is exhibiting a state of charge that is in excess of a selected threshold, then the power on the DC bus 125 is directed only to the power management system 190 to power only the TRU 26, (as the and the energy storage system 150 does not yet require recharging). Similarly, in yet another embodiment, as depicted by FIG. 4C, a third power flow for power supplied from the generator 162 and/or generator power converter 164. In this embodiment, the logic employed by the TRU controller 82 for directing the power to the power management system 190 addresses an instance when the TRU 26 is inoperative, and the energy storage system 150 indicates that the energy storage device 152 is exhibiting a state of charge that is less than a selected threshold (in this instance 100%, though other thresholds are possible). In this embodiment, the DC power on the DC bus 125 is directed only to the energy storage system 150 for recharging the energy storage device 152.

Figure 4D:
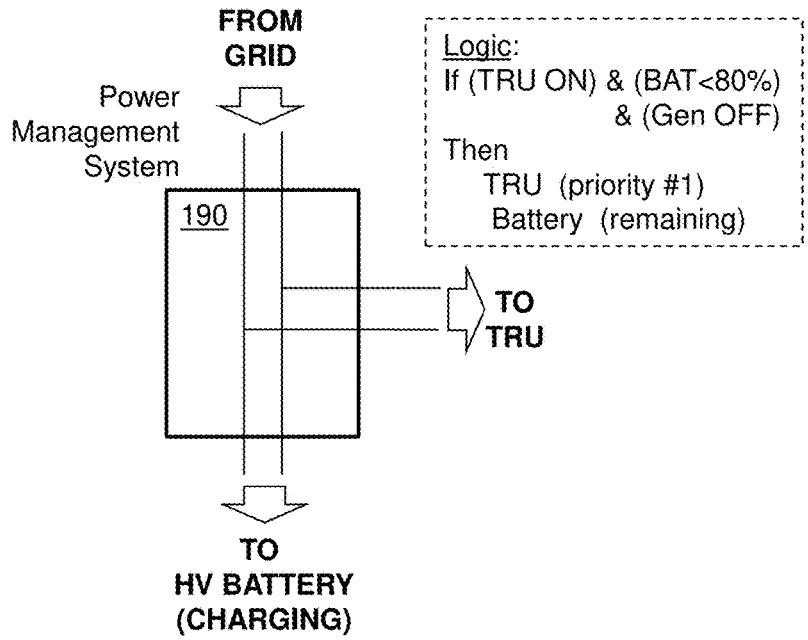
FIG. 4D depicts power flows of the power management system, according to an embodiment of the present disclosure.
Figure 4E:
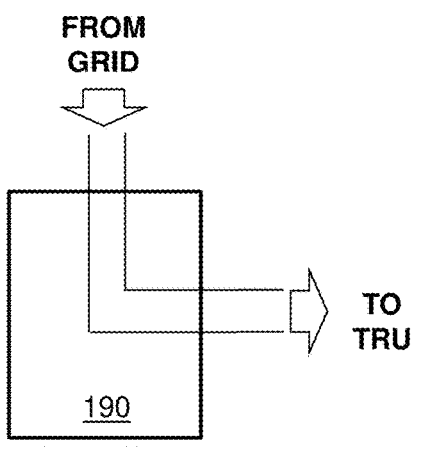
FIG. 4E depicts power flows of the power management system, according to an embodiment of the present disclosure.
Figure 4F:
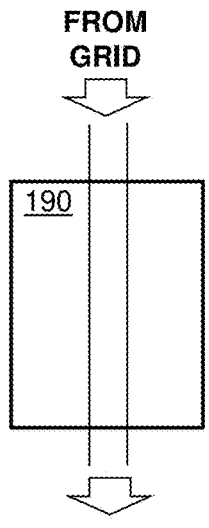
FIG. 4F depicts power flows of the power management system, according to an embodiment of the present disclosure.
Figure 5A:
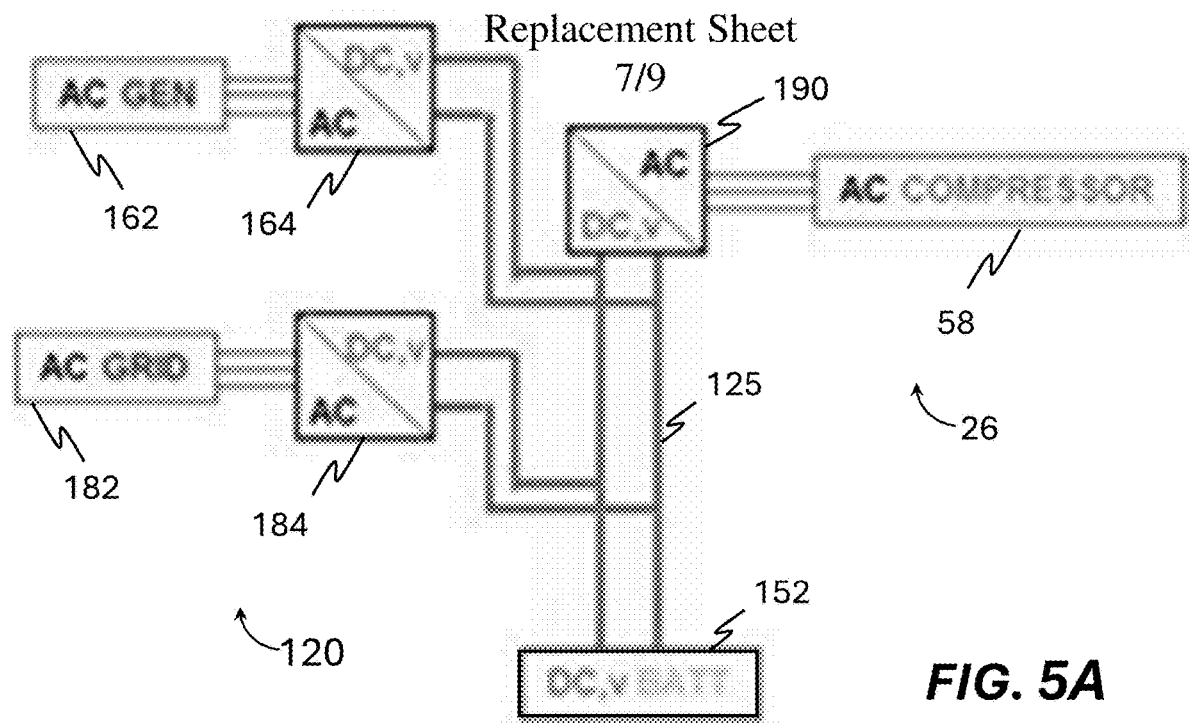
FIG. 5A is a block diagram of a transportation refrigeration unit and power system, according to an embodiment of the present disclosure.

Turning now to FIGS. 4D-4F, which depict power flows for power supplied from the grid power source 182. In an embodiment as depicted in FIG. 4D, the logic employed by the TRU controller 82 for directing the power from the grid power source 182 determines if the TRU 26 is operating and the generator 162 (or the generator power converter 164) is inoperative. If so, and the energy storage system 150 indicates that the energy storage device 152 is exhibiting a charge state that is less than a selected threshold, then power is directed from the DC bus 125 to both the power management system 190 and then the TRU system 26 and the energy storage system 150 for recharging the energy storage device 152. In an embodiment, once again, priority is given to satisfying the power requirements of the TRU system 26. Any remaining power may be directed to the recharging application for the energy storage system 150. It should be appreciated that while particular threshold of 80% is disclosed and employed for the described embodiments, such values and description are merely illustrative. Other values and applications for the thresholds are possible.

Referring now to FIG. 4E as well, the figure depicts a second instance for power flows for power supplied from the grid power source 182 when the generator 162 is inoperative. In this embodiment, if the TRU 26 is operating, and the energy storage system 150 indicates that the energy storage device 152 is exhibiting a state of charge that is in excess of a selected threshold, then the DC power on the DC bus 125 is directed only to the power management system 190 directs and to the TRU 26, (as the energy storage system 150 does not yet require recharging). Similarly, in yet another embodiment, as depicted by FIG. 4F, a third power flow for power supplied from the grid power source 182 when the generator 162 is inoperative. In this embodiment, the logic employed by the TRU controller 82 for directing the power on the DC bus 125 addresses an instance when the TRU 26 is also inoperative, and the energy storage system 150 indicates that the energy storage device 152 is exhibiting a state of charge that is less than a selected threshold (in this instance 100%, though other thresholds are possible). In this embodiment, the power on the DC bus 125 is directed only to the energy storage system 150 for recharging the energy storage device 152. In an embodiment, priority is given to satisfying the power requirements of energy storage system 150.

Figure 4G:
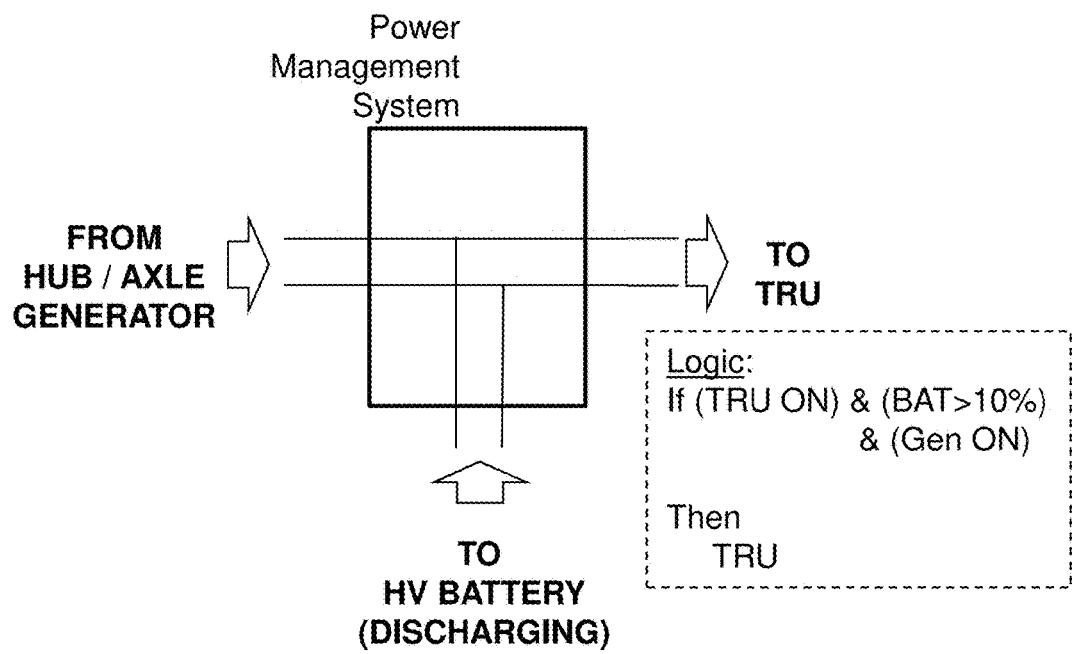
FIG. 4G depicts power flows of the power management system, according to an embodiment of the present disclosure.
Figure 4H:
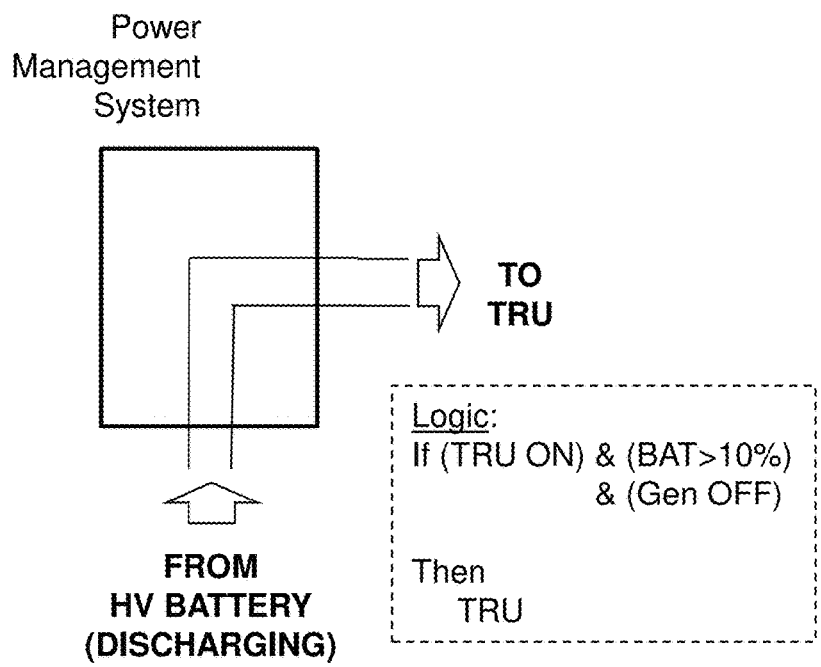
FIG. 4H depicts power flows of the power management system, according to an embodiment of the present disclosure.

Turning now FIGS. 4G and 4H, which depict power flows for power supplied to the power management system 190 and the TRU 26 under selected conditions for operating from the energy storage system 150 as well. In FIG. 4G power flows to the TRU 26 are provided from the generator 162 and/or generator power converter 164 (e.g., second DC power 165) as well as from the energy storage system 150. In an embodiment, the logic employed by the TRU controller 82 for directing the power to the DC bus 125 and the power management system 190 determines if the TRU 26 is operating. If so, and the energy storage system 150 indicates that the energy storage device 152 is exhibiting a charge state of greater than a selected threshold, then power from both the generator 162 (or generator power converter 164) and the energy storage system 150 is directed to DC bus 125 and then to the power management system 190 and thereby the TRU 26. In an embodiment, a threshold of 10 percent is employed for the state of charge of the energy storage device 152. In this embodiment, power is provided by the energy storage system 150 and thereby discharging the energy storage device 152. In an embodiment, priority is given to satisfying the power requirements of the TRU 26. This embodiment may be employed under conditions where the output power of the generator 162 and/or generator power converter 164 is less that that needed to operate the TRU 26. It should be appreciated that while particular threshold of 10% is disclosed and employed for the described embodiments, such values and description are merely illustrative. Other values and applications for the thresholds are possible. For example, in some instances it may be desirable prioritize operation of the TRU 26 such that fully draining the energy storage device 152 is acceptable. Likewise, in other embodiments, it may be desirable to modify the function or curtail the operation of the TRU 26 to avoid excessively discharging the energy storage device 152.

Referring now to FIG. 4H as well, the figure depicts a second instance for power flows from the energy storage system 150 alone. In this embodiment, if the TRU 26 is operating, but the generator 162 and/or the generator power converter 164 is inoperative, if the energy storage system 150 indicates that the energy storage device 152 is exhibiting a state of charge that is in excess of a selected threshold, then the power on the DC bus is directed to the power management system 190, which then provides power to the TRU 26. In an embodiment a threshold of 10 percent is employed for the state of charge of the energy storage device 152. In this embodiment, power is provided by the energy storage system 150 and thereby discharging the energy storage device 152. In an embodiment, priority is given to satisfying the power requirements of the TRU 26. Once again, this embodiment may be employed under conditions where the output power of the generator 162 and/or generator power converter 164 is less that that needed to operate the TRU 26. It should be appreciated that while particular threshold of 10% is disclosed and employed for the described embodiments, such values and description are merely illustrative. Other values and applications for the thresholds are possible. For example, in some instances it may be desirable prioritize operation of the TRU 26 such that fully draining the energy storage device 152 is acceptable. Likewise, in other embodiments, it may be desirable to modify the function or curtail the operation of the TRU to avoid excessively discharging the energy storage device 152.

Returning to FIG. 3, in another embodiment and specialized mode of operation and power flow for the TRU system 26 and the power supply interface 120. In this embodiment, referred to as a fail operational or "limp home" mode, the power supply interface 120 is configured such that, in selected modes of operation power is directed to the TRU 26 from the tractor or vehicle 22. In an embodiment, should the energy storage device 152 exhibit a SOC below a selected threshold e.g., <10% and the generator 162/generator power converter 164 is not operable but the TRU system 26 is operable and requires power, TRU power could be drawn from the power system of the tractor or truck. (i.e. tie into the energy storage device or generator of the tractor/truck). Moreover, it should be appreciated that the described embodiments while generally referring the generator 162 being installed on the trailer portion of the vehicle, 22, such description is merely illustrative. In another embodiment, the generator 162 or another generator could be installed at a hub or axle of the tractor portion of the vehicle 22 without loss of generality and still be fully applicable to the described embodiments. In an embodiment, the tractor/truck power may be routed to the power supply interface 120 through a grid plug 189. Alternately connectable between the grid power source 182 and the vehicle power. For example, in operation, when vehicle 22 trailer is in operation, for example, on delivery, grid plug 189 would be plugged into the tractor/trailer's electric PTO and act as mobile grid source. The TRU controller 82 would be programmed to determine if the grid plug is active and if so, to pull power (or supplement generator power) only if energy storage device SOC is below threshold as alternative to modify the function or curtail the operation of the TRU system 26.

Figure 5B:
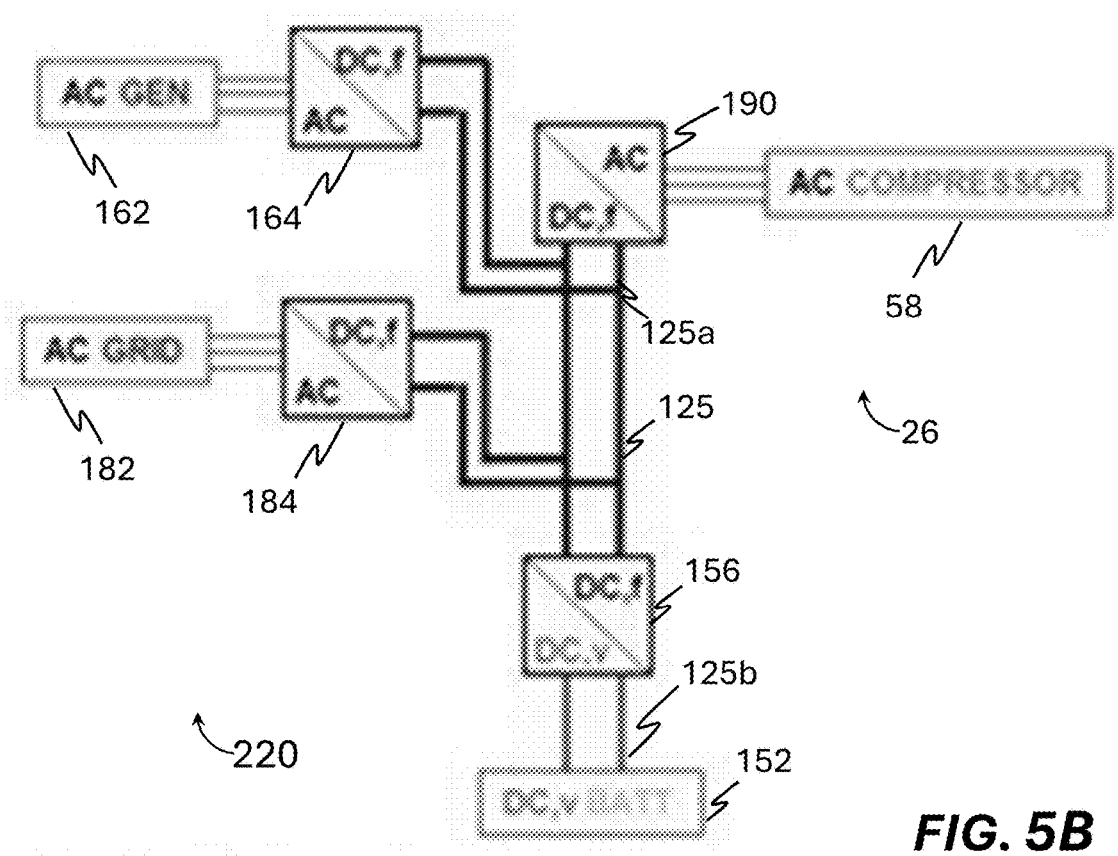
FIG. 5B is a block diagram of a transportation refrigeration unit and power system, according to an embodiment of the present disclosure.

Turning now to FIGS. 5A-5H, FIGS. 5A-5H depict a plurality of possible configurations for the power supply interface 120. FIG. 5A depicts a simplified block diagram of the power supply interface 120 as described herein. FIG. 5A depicts the single DC bus 125 in a variable configuration. FIG. 5B depicts the alternate embodiment of the power supply interface 120 as described above. In this embodiment, the DC bus is split with a variable side 125 *b* between the energy storage device 152 and the DC/DC converter 156 and a fixed DC bus 125, 125 *a* on the output side of the DC/DC converter 156 of the energy storage system 150.

Figure 5C:
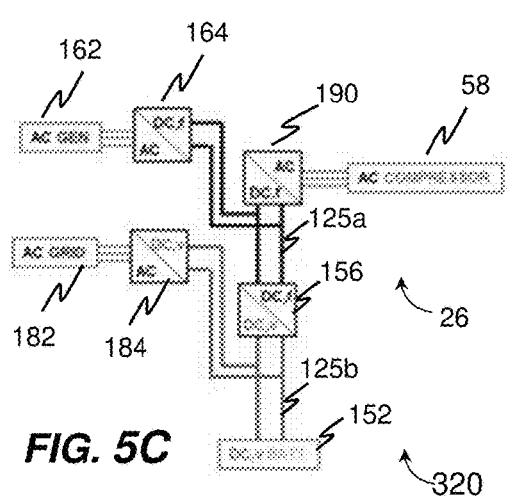
FIG. 5C is a block diagram of a transportation refrigeration unit and power system, according to an embodiment of the present disclosure.

FIG. 5C depicts a simplified block diagram of the power supply interface 320 in accordance with another embodiment as described herein. FIG. 5C depicts a configuration of the power supply interface 320 where the grid power supply 182 and grid power converter 184 are commonly connected with the energy storage device 152 on the DC bus 125*b* in a variable configuration. In this embodiment the DC/DC converter 156 isolates the variable DC bus 125*b* from the fixed DC bus 125*a* which includes the output of the DC/DC converter 156 of the energy storage system 150 and the output of the generator power converter 164 commonly connected with the DC/AC converter 192 of the power management system 190 to provide power to the TRU system 26.

Figure 5D:
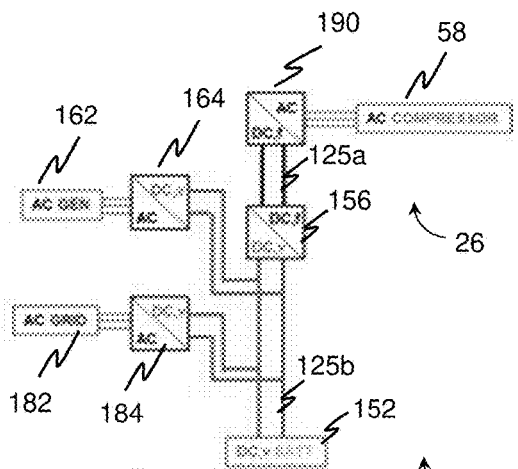
FIG. 5D is a block diagram of a transportation refrigeration unit and power system, according to an embodiment of the present disclosure.

Similarly, FIG. 5D depicts a simplified block diagram of the power supply interface 420 in accordance with yet another embodiment as described herein. FIG. 5D depicts a configuration of the power supply interface 420 where the grid power supply 182 and grid power converter 184 are commonly connected with the generator 162 and the output of the generator power converter 164 with energy storage device 152 on the DC bus 125*b* in a variable configuration. In this embodiment the DC/DC converter 156 isolates the variable DC bus 125*b* from the fixed DC bus 125*a* which includes the output of the DC/DC converter 156 of the energy storage system 150 commonly connected with the DC/AC converter 192 of the power management system 190 to provide power to the TRU system 26.

Figure 5E:
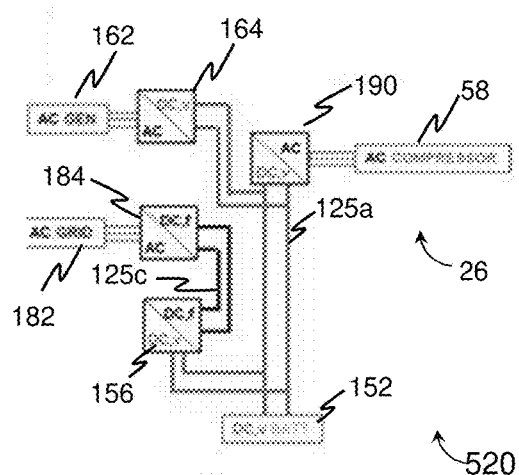
FIG. 5E is a block diagram of a transportation refrigeration unit and power system, according to an embodiment of the present disclosure.

Likewise, FIG. 5E depicts a simplified block diagram of the power supply interface 520 in accordance with yet another embodiment as described herein. FIG. 5E depicts a configuration of the power supply interface 520 where the grid power supply 182 and grid power converter 184 are connected in series with the DC/DC converter 156 forming the fixed DC bus denoted 125*c* between the grid power converter and the DC/DC converter 156 of the energy storage system 150. In this embodiment the DC/DC converter 156 isolates the fixed DC bus 125*c* from the variable DC bus 125*a*. The generator 162 and the output of the generator power converter 164 along with the energy storage device 152 are connected on the variable DC bus 125*a* in a variable configuration with the DC/AC converter 192 of the power management system 190 to provide power to the TRU system 26.

Figure 5F:
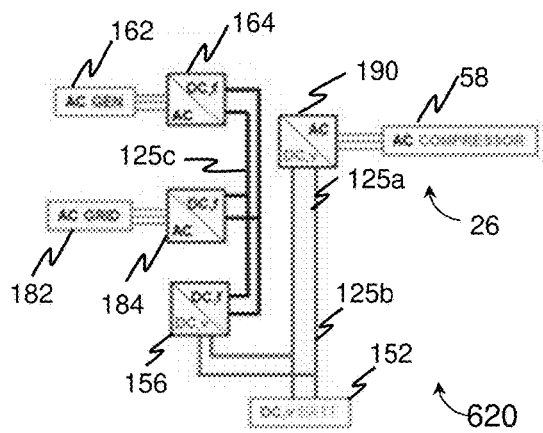
FIG. 5F is a block diagram of a transportation refrigeration unit and power system, according to an embodiment of the present disclosure.

Likewise, FIG. 5F depicts another simplified block diagram of the power supply interface 620 in accordance with still another embodiment as described herein. FIG. 5F depicts a configuration of the power supply interface 620 where the grid power supply 182 and grid power converter 184 as well as the generator 162 and the output of the generator power converter 164 are connected with the DC/DC converter 156 forming the fixed DC bus denoted once again 125*c*. Once again DC/DC converter 156 of the energy storage system isolates the fixed DC bus 125*c* from the variable DC bus 125*a*. In addition, the output of the DC/DC converter 156 of the energy storage system 150 is connected along with the energy storage device 152 on the variable DC bus 125*a* in a variable configuration with the DC/AC converter 192 of the power management system 190 to provide power to the TRU system 26.

Figure 5G:
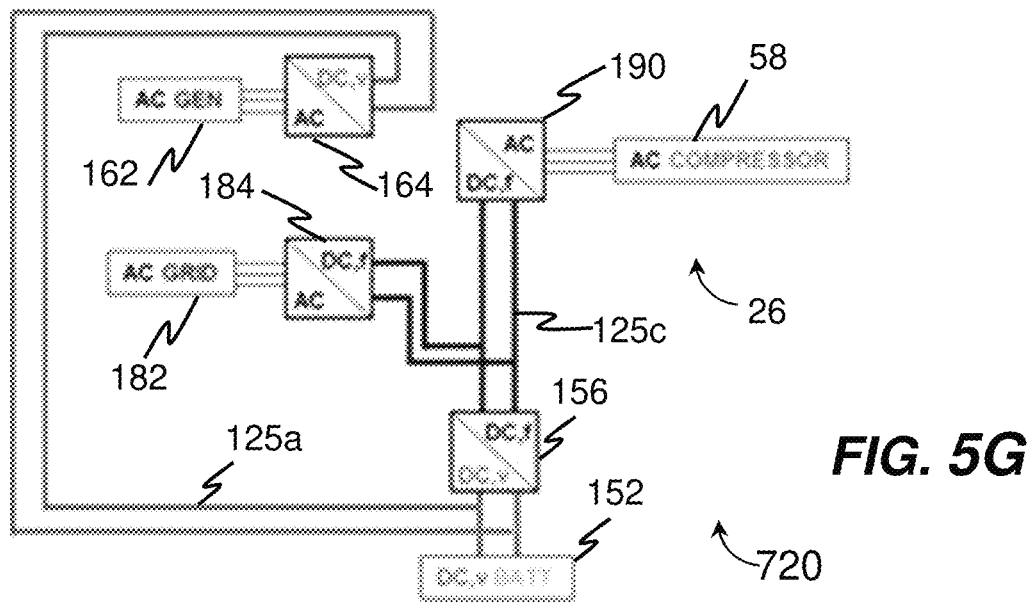
FIG. 5G is a block diagram of a transportation refrigeration unit and power system, according to an embodiment of the present disclosure.

Likewise, FIG. 5G depicts a simplified block diagram of the power supply interface 720 in accordance with still yet another embodiment as described herein. FIG. 5G depicts a configuration of the power supply interface 720 where the generator 162 and the output of the generator power converter 164 are connected with the energy storage device 152 on the variable DC bus 125*a* in a variable configuration. The DC/DC converter 156 of the energy storage system forming the fixed DC bus denoted once again 125*c*, once again DC/DC converter 156 isolates the fixed DC bus 125*c* from the variable DC bus 125*a*. In addition, the output of the DC/DC converter 156 of the energy storage system 150 is connected along with grid power converter 184 to fixed DC bus 125c, providing power the DC/AC converter 192 of the power management system 190 to provide power to the TRU system 26.

Figure 5H:
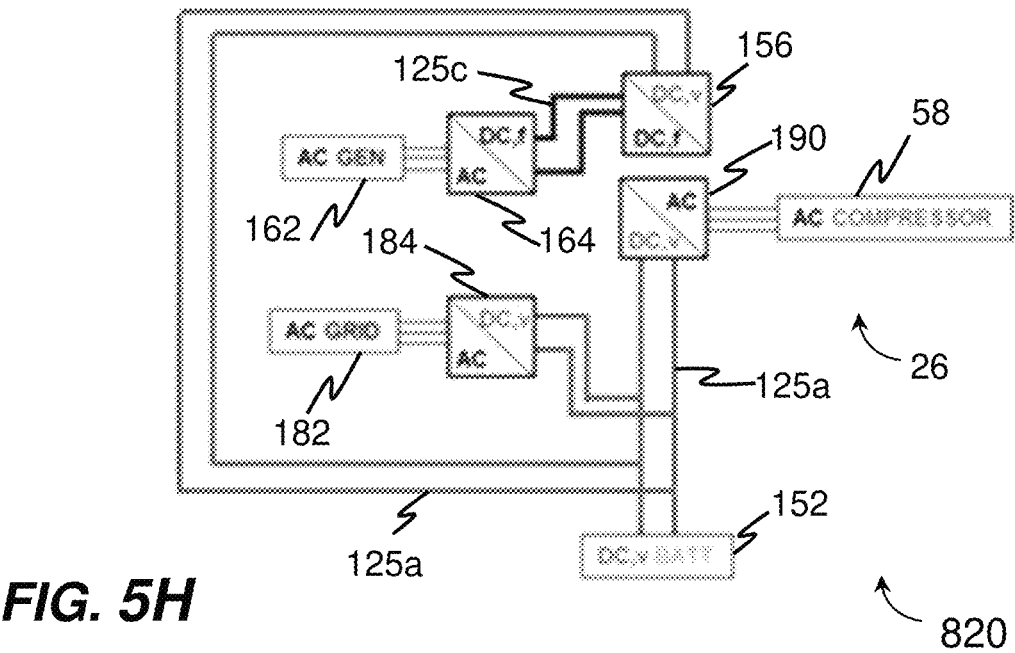
FIG. 5H is a block diagram of a transportation refrigeration unit and power system, according to an embodiment of the present disclosure.

Finally, FIG. 5H depicts a simplified block diagram of the power supply interface 820 in accordance with still yet another embodiment as described herein. FIG. 5G depicts a configuration of the power supply interface 820 where the generator 182 is connected to the generator power converter 184 to a fixed voltage DC bus 125c. The grid power source 182 via the output of the grid power converter 184 is connected with the energy storage device 152 on the variable DC bus 125a in a variable configuration. The DC/DC converter 156 of the energy storage system 150 is connected to the generator power converter 164 on the fixed DC bus 125c. Once again DC/DC converter 156 isolates the fixed DC bus 125c from the variable DC bus 125a. In addition, the output of the DC/DC converter 156 of the energy storage system 150 is connected along with the energy storage device 152 on the variable DC bus 125a and providing power the DC/AC converter 192 of the power management system 190 to provide power to the TRU system 26.

The TRU 26 may further include a renewable power source 110 (FIG. 1) configured to recharge the batteries of the energy storage device 152. One embodiment of a renewable power source 110 may be solar panels mounted, for example, to the outside of the top wall 30 of the container 24 (also see FIG. 1). For example the renewable power source 110 could generate all or a portion of the needed low voltage DC power for the TRU controller 82. Once again, such a configuration simplifies the wiring and routing of the system design by eliminating an additional set of DC cabling from the energy storage device 152 beyond the HV cabling going toe the AC/DC converter 156.

Benefits of the present disclosure when compared to more traditional systems include no fuel carriage, fuel system and fuel consumption, and a refrigeration unit that emits less noise and no combustion byproducts. Yet further, the present disclosure includes an energy storage device that is conveniently and efficiently recharged to meet the power demands of the refrigeration unit.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes a device for practicing the embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A power system architecture for powering a transportation refrigeration system comprising:
   a transport refrigeration unit (TRU) operable in a vapor compression cycle, the TRU having a compressor configured to compress a refrigerant, an evaporator heat exchanger operatively coupled to the compressor, an evaporator fan configured to provide return airflow from a return air intake and flow the return airflow over the evaporator heat exchanger, the TRU also including a TRU controller configured to execute a process to determine an alternating current (AC) power requirement for the TRU;
   a generator power converter configured to receive power from an AC generator operably coupled to an axle or wheel hub, and the generator power converter configured to provide a generator direct current (DC) power;
   a grid power converter configured to receive a grid three phase AC power from a grid power source operable to provide the grid three phase AC power;
   the grid power converter operable to provide a grid DC power;
   an energy storage device, the energy storage device operable to provide a first DC power and connected to a variable DC bus;
   a power management system operably connected to direct three phase AC power to the TRU based at least in part on at least the AC power requirement;
   an energy storage system including the energy storage device and a first energy storage system DC/DC converter configured to provide first DC power on a fixed DC bus to the power management system based at least in part on the AC power requirement and a second energy storage system DC/DC converter configured to convert at least a portion of a second DC power on the fixed DC bus to supply the variable DC bus and the energy storage device.

2. The power system architecture of claim 1, wherein the generator power converter is configured to transmit the generator DC power to both of the fixed DC bus and the variable DC bus.

3. The power system architecture of claim 1, wherein the generator power converter is responsive at least in part to the AC power requirement.

4. The power system architecture of claim 1, wherein the grid power converter is configured to transmit the grid DC power to one of the fixed DC bus or the variable DC bus.

5. The power system architecture of claim 1, wherein the grid power converter is responsive at least in part to the AC power requirement.

6. The power system architecture of claim 1, wherein the energy storage device comprises at least one of a battery, fuel cell, and flow battery.

7. The power system architecture of claim 1, wherein the power management system includes a DC/AC converter configured to generate the three phase AC power.

8. The power system architecture of claim 1, further including a return air temperature (RAT) sensor disposed in the return airflow the TRU controller configured to determine the AC power requirement for the TRU based at least in part on the RAT.

* * * * *